(12) United States Patent
Ikeda

(10) Patent No.: US 8,071,403 B2
(45) Date of Patent: Dec. 6, 2011

(54) METHOD OF MANUFACTURING LIQUID CRYSTAL DISPLAY DEVICE

(75) Inventor: Masaki Ikeda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 193 days.

(21) Appl. No.: 12/670,635

(22) PCT Filed: May 1, 2008

(86) PCT No.: PCT/JP2008/058352
§ 371 (c)(1),
(2), (4) Date: Jan. 25, 2010

(87) PCT Pub. No.: WO2009/022482
PCT Pub. Date: Feb. 19, 2009

(65) Prior Publication Data
US 2010/0210050 A1 Aug. 19, 2010

(30) Foreign Application Priority Data
Aug. 16, 2007 (JP) ................................. 2007-212322

(51) Int. Cl.
*H01L 21/00* (2006.01)
(52) U.S. Cl. ................. 438/30; 438/29; 438/45; 438/70; 257/E21.211; 257/E21.527; 257/E21.536
(58) Field of Classification Search .................. 438/519, 438/914; 257/E21.497, E21.527, E21.536
See application file for complete search history.

(56) References Cited

U.S. PATENT DOCUMENTS

2001/0031691 A1 10/2001 Miura et al.
2010/0155747 A1* 6/2010 Yang et al. ....................... 257/88

FOREIGN PATENT DOCUMENTS

| JP | 5-257008 A | 8/1993 |
| JP | 11-60271 A | 3/1999 |
| JP | 2001-235609 A | 8/2001 |
| JP | 2007-65502 A | 3/2007 |

OTHER PUBLICATIONS

Chinese Office Action for Application No. 200880102812.X, The State Intellectual Property Office of the People's Republic of China, Mar. 7, 2011.

* cited by examiner

*Primary Examiner* — Cheung Lee
(74) *Attorney, Agent, or Firm* — Birch, Stewart, Kolasch & Birch, LLP

(57) ABSTRACT

A method of manufacturing a liquid crystal display device of the present invention includes a color defect compensation process for compensating for a color defect if it is present in a color filter that includes color portions in a plurality of colors. The color defect compensation process includes specifying a compensation area in at least one of glass substrate among a pair of glass substrates, the compensation area that overlaps a shadow of a color defect occurrence area, which is a possible cause of the color defect, and the shadow projected on a glass substrate, doping metal ions that correspond to a color of the color portion that includes the color defect occurrence area in the compensation area of the glass substrate, which is specified, and forming a colored portion having the same color as the color portion that includes the color defect occurrence area in the compensation area.

11 Claims, 10 Drawing Sheets

METHOD OF MANUFACTURING LIQUID CRYSTAL DISPLAY DEVICE

TECHNICAL FIELD

The present invention relates to a method of manufacturing a liquid crystal display device.

BACKGROUND ART

A liquid crystal display device includes a liquid crystal panel having a liquid crystal layer between a pair of glass substrates and a lighting device arranged behind the liquid crystal panel. In such a liquid crystal display device, a color filter in which colored portions of R (red), G (green), B (blue) and the like are arranged is generally provided in one of the pair of glass substrates so that white light provided by the lighting device are present in various colors after passing through the color filter.

The color filter in such a liquid crystal display device is formed by a photolithographic method, for example. In the photolithographic method, resin materials colored with pigment or dyes are applied to a surface of glass substrate and the resin materials are etched using photoresist. With this method, portions in preferable colors can be precisely arranged in the glass substrate.

A method disclosed in Patent Document 1 is known as means for coloring a colorless member capable of light transmission, other than the above described method. Patent Document 1 discloses a method of coloring a region in which metal micro particles are selectively deposited, the region being formed by applying pulse laser beams to a glass material that contains metal ions such that a focus of the laser beams is set inside the glass material.

Patent Document 1: JP-A-11-60271

DISCLOSURE OF THE PRESENT INVENTION

Problem to be Solved by the Invention

Because the above-described color filter is formed with a very thin resin layer, a part of it may be scratched by a foreign substance, for example, and damaged in a manufacturing process of the liquid crystal display device. In such a case, display corresponding the damaged area falls into a color failure, in which it only produces a color of light (usually white) provided by the lighting device, that is, a white spot is displayed. This leads to degradation of display quality.

The present invention was made in view of the foregoing circumstances, and an object thereof is to provide a method of manufacturing the liquid crystal display device including a compensating for a color failure in the color filter to produce a predetermined color. Another object is to provide the liquid crystal display device including a member that has a color filtering function and is less subject to breakage.

Means for Solving the Problem

To solve the above-described problem, a method of manufacturing a liquid crystal display device of the present invention has the following feature. The liquid crystal display device includes a liquid crystal panel having a liquid crystal layer between a pair of glass substrates, and a lighting device that provides illumination light to the liquid crystal panel. At least one of the pair of glass substrates includes a color filter in which color portions in a plurality of colors are formed in a predetermined arrangement. The method includes a color defect compensation process that compensates for a color defect if it is present in the color filter. The color defect compensation process includes specifying a compensation area in at least one of the pair of glass substrates, the compensation area that overlaps a shadow of color defect occurrence area, which is a possible cause of the color defect, and the shadow projected on the glass substrate, doping metal ions corresponding to a color of the color portion that includes the color defect occurrence area in the specified compensation area of the glass substrate, and forming a colored portion having the same color as the color portion that includes the color defect occurrence area in the compensation area by applying laser having a femtosecond-order or shorter pulse width to the metal ions that are doped.

During search for means for compensating for a color defect (i.e., a white spot) caused by a damaged color filter, for example, the inventor of the present invention found means for coloring a compensation area that overlaps a color defect occurrence area, which is a possible cause of a color defect, in the glass substrate in an original color of the color defect. When a glass substrate is colored with such means, light that passes through the color defect occurrence area of the color filter among light provided by a lighting device always passes through an area of the glass substrate that is colored (i.e., a colored portion). As a result, the light is colored when passing through the colored portion of the glass substrate although it is not colored when passing through the color defect occurrence area of the color filter. Thus, the same color as that of the light being passed through a normal area of the color filter is viewed on a display surface, that is, the color defect is properly compensated.

Furthermore, as means for coloring the glass substrate, means for coloring in a predetermined color by doping metal ions in the compensation area of the glass substrate and applying laser to the metal ions is selected. Such a coloring means with metal ion doping is less likely to degrade strength of the glass substrate while various colors can be present depending on kinds of metal ions. Therefore, it is preferable means for coloring a glass substrate.

Moreover, laser having a femtosecond-order or shorter pulse width is used for the above laser application. Laser having a picosecond or longer pulse width can be used to color the glass substrate. However, an average energy level is very high and a surrounding area of the laser focus may be thermally damaged and a surround area of the compensation area may become clouded. On the other hand, when applying laser having a femtosecond-order or shorter pulse width, energy is absorbed in the laser application area faster than conduction of heat generated by the laser to the surrounding area. Thus, the surrounding area is not thermally or chemically damaged.

In the doping, the glass substrate is masked in an area other than the compensation area.

By masking the area other than the compensation area, the metal ions can be doped only in the compensation area. This restricts mixture of colors with other portions in different colors.

BEST MODE FOR CARRYING OUT THE INVENTION

Embodiment 1

Embodiment 1 of the present invention will be explained with reference to FIGS. 1 to 7. First, a liquid crystal display device produced by a manufacturing method of the present invention will be explained with reference to FIGS. 1 to 4.

Figure 1:
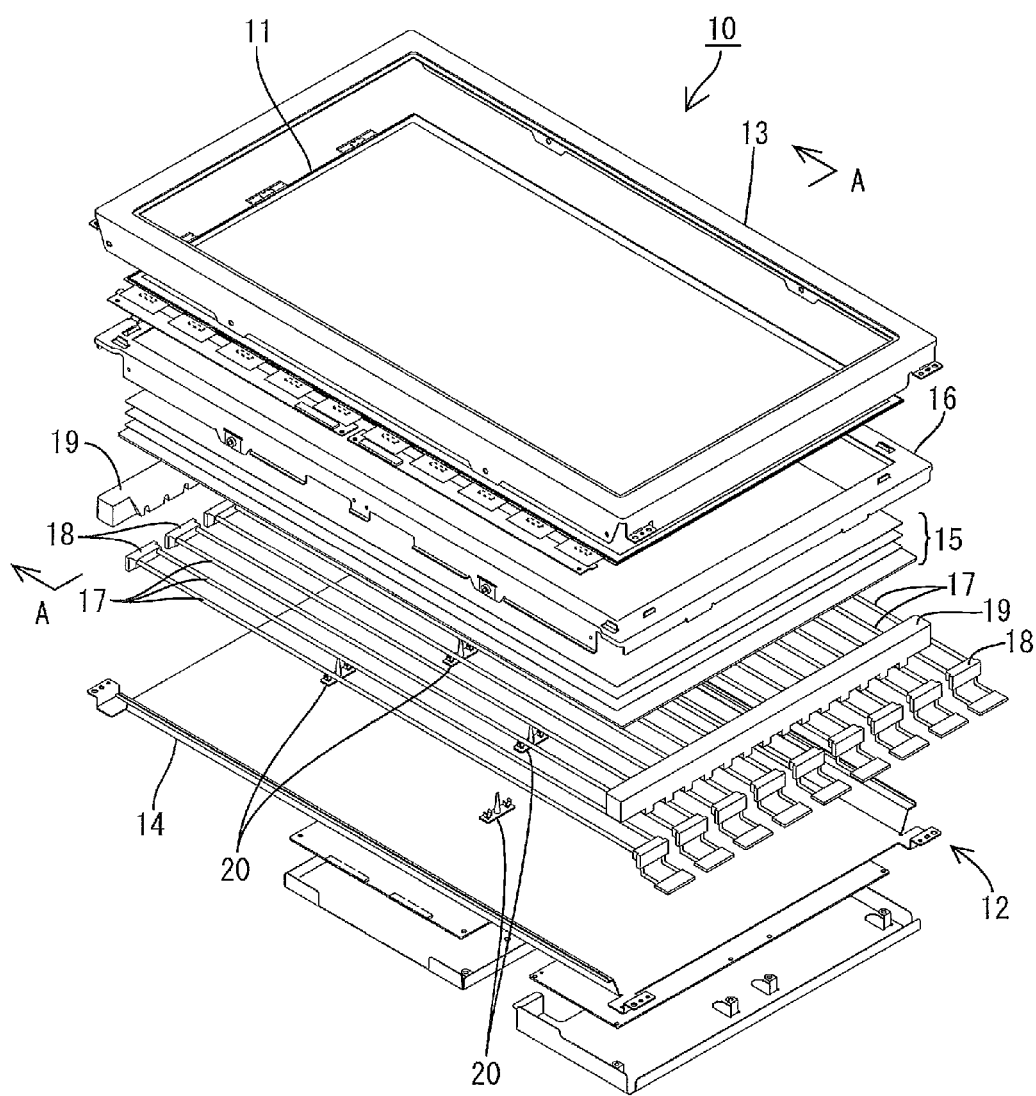
FIG. 1 is a perspective view illustrating a general construction of a liquid crystal display device according to embodiment 1 of the present invention.
Figure 2:
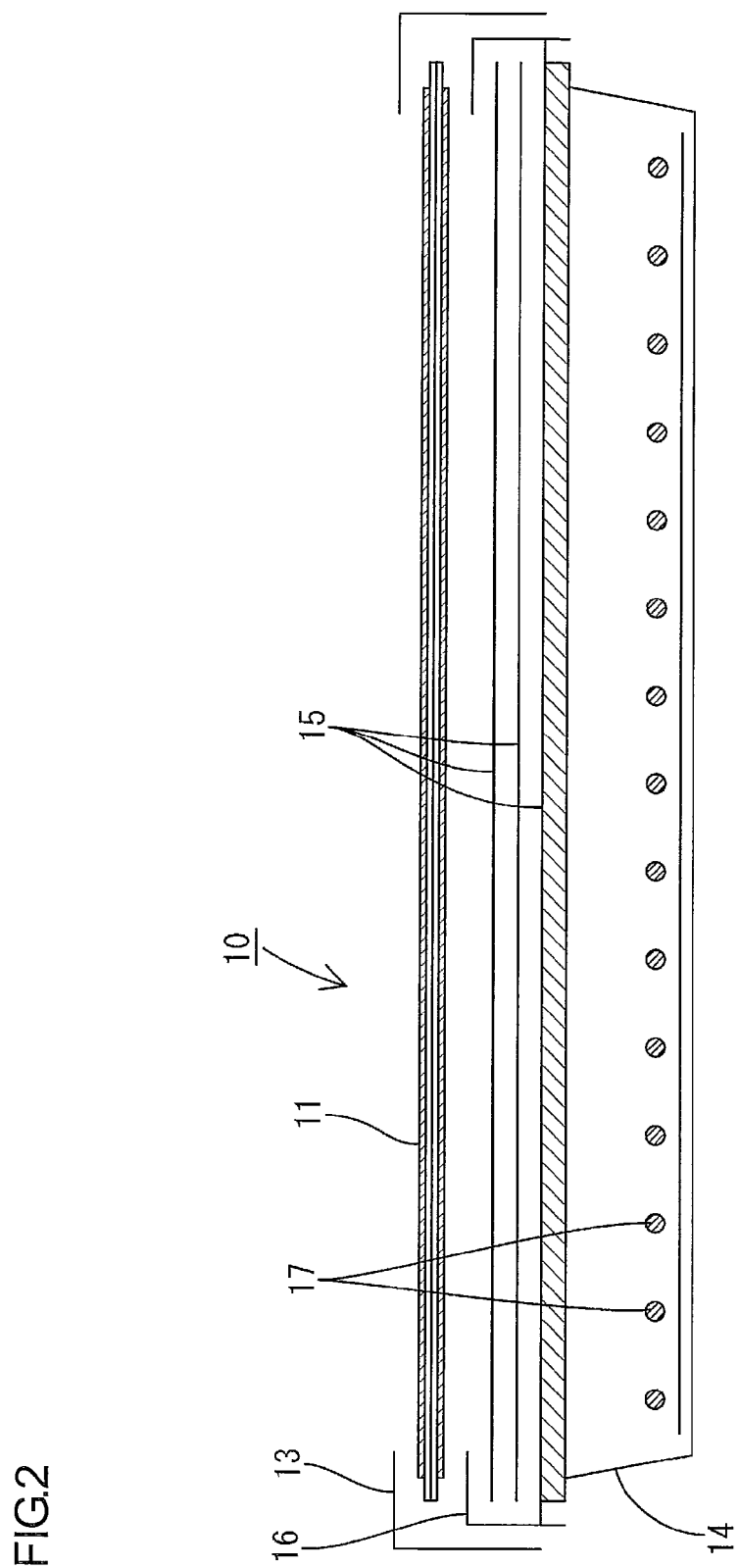
FIG. 2 is a cross-sectional view of the liquid crystal display device illustrated in FIG. 1 along the line A-A.
Figure 3:
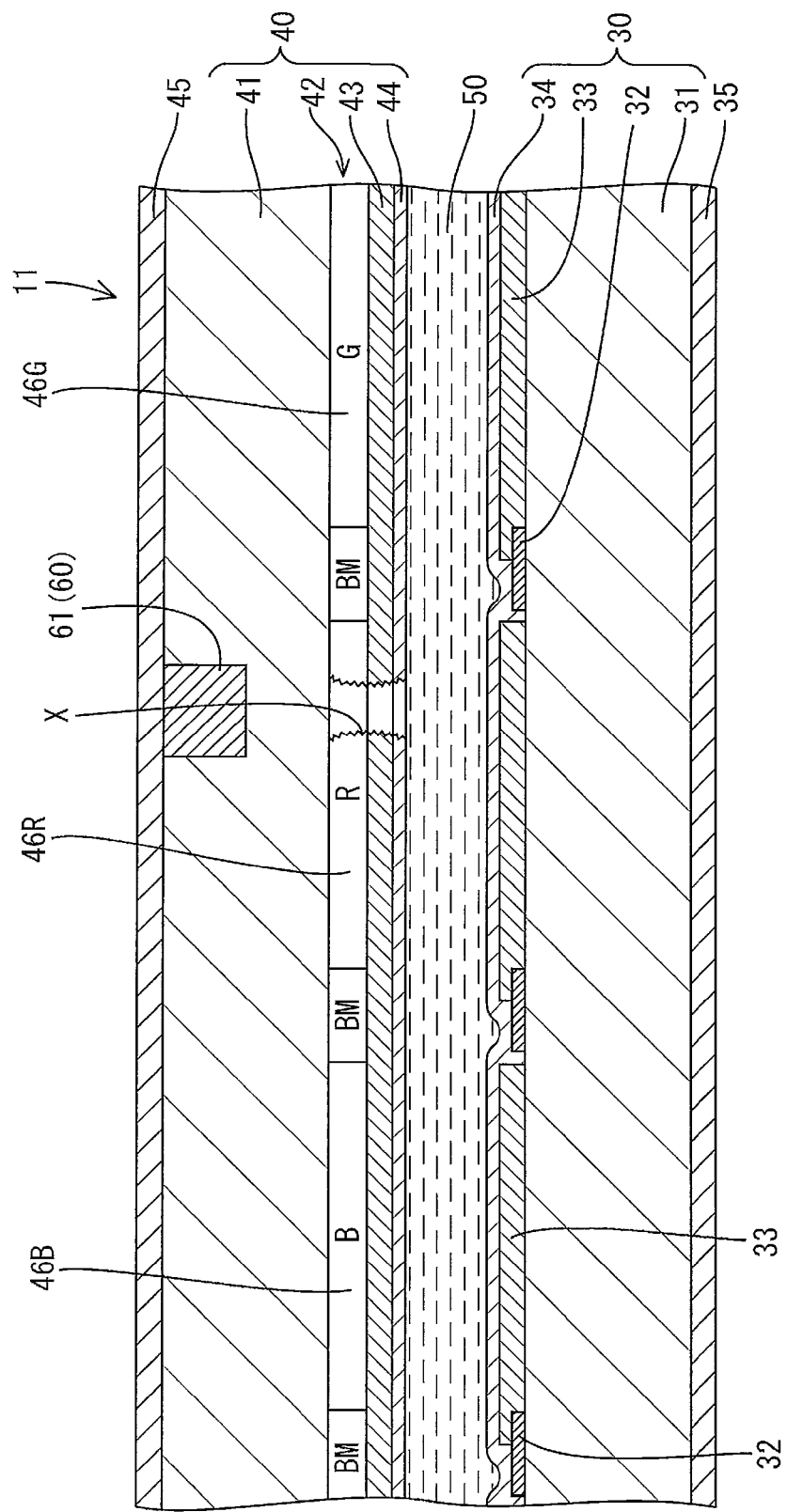
FIG. 3 is a cross-sectional view of a main part of a liquid crystal panel included in the liquid crystal display device illustrated in FIG. 1.
Figure 4:
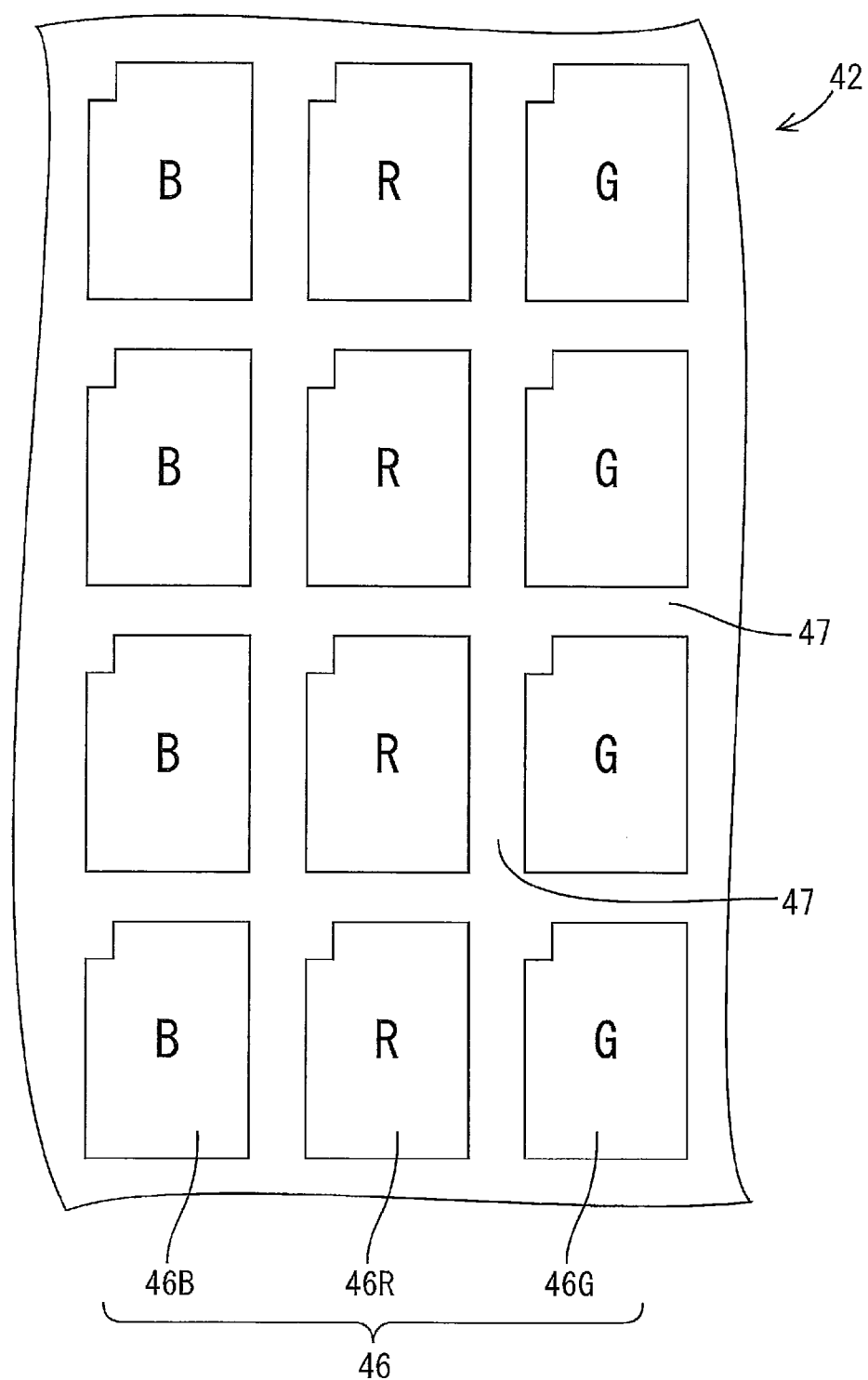
FIG. 4 is a plan view of a main part of a color filter included in the liquid crystal panel illustrated in FIG. 3.

FIG. 1 is a perspective view illustrating a general construction of a liquid crystal display device according to the present embodiment. FIG. 2 is a cross-sectional view of the liquid crystal display device illustrated in FIG. 1 along the line A-A. FIG. 3 is a cross-sectional view of a main part of a liquid crystal panel included in the liquid crystal display device illustrated in FIG. 1. FIG. 4 is a plan view of a main part of a color filter included in the liquid crystal display panel.

An overall construction of a liquid crystal display device 10 will be explained. The liquid crystal display device 10, as illustrated in FIGS. 1 and 2, includes a liquid crystal panel 11 having a rectangular shape and a backlight device (i.e., lighting device) 12, which is an external light source, disposed directly below the backside of a panel surface (or a display surface) of the liquid crystal panel 11. The liquid crystal panel 11 and the backlight device 12 are integrally held by a bezel 13 and the like.

The backlight device 12 includes a backlight chassis (i.e., chassis) 14, a plurality of optical members 15 (a diffuser plate, a diffusing sheet, a lens sheet and a reflection type polarizing plate, arranged in this order from the lower side of the drawings) and a frame 16. The backlight chassis 14 is formed in a substantially box-shape having an opening on a top. The optical members 15 are arranged so as to cover the opening of the backlight chassis 14. The frame 16 holds the optical members 15 to the backlight chassis 14. Furthermore, cold cathode tubes 17, resin holders 18, lamp holders 19 and lamp clips 20 are installed in the backlight chassis 14. Each cold cathode tube 17 having an elongated tubular shape housed in the backlight chassis 14 such that the longitudinal direction (i.e., axial direction) of each cold cathode tube 17 matches the longitudinal direction of the backlight chassis 14. The resin holders 18 hold ends of the cold cathode tubes 17. The lamp holders 19 collectively cover ends of cold cathode tubes 17 and the holders 18. The lamp clips 20 hold the cold cathode tubes 17 to the backlight chassis 14. A light emitting side of the backlight device 12 is a side closer to the optical member 15 than the cold cathode tube 17 and the cold cathode tubes 17 emit white light.

Next, the liquid crystal panel 11 will be explained. The liquid crystal panel 11, as illustrated in FIG. 3, includes a pair of boards 30, 40 bounded together with a predetermined gap between them and liquid crystal sealed between those boards 30, 40. The liquid crystal forms a liquid crystal layer 50.

The board 30 is a component board including a glass substrate 31, TFTs (Thin Film Transistor) 32, pixel electrodes 33 and an alignment film 34. The TFTs 32, which are semiconductor components, are formed on a liquid crystal layer 50 side of the glass substrate 31. The pixel electrodes 33 are electrically connected with the TFTs 32. The alignment film 34 is formed on the liquid crystal layer 50 side of the TFTs 32 and pixel electrodes 33. On opposite side of the glass substrate 31 from the liquid crystal layer 50, a polarizing plate 35 is provided. The board 30 (or the glass substrate 31) among the pair of boards 30, 40 is arranged on a backlight device 12 side.

The board 40 is an opposite board including a glass substrate 41, a color filter 42, an counter electrode 43, and alignment film 44. The color filter 42 is formed on the liquid crystal layer 50 side of the glass substrate. The counter electrode 43 is formed on the liquid crystal 50 side of the color filter 42. The alignment film 44 is formed on the liquid crystal 50 side of the counter electrode 43. On an opposite side of the glass substrate 41 from the liquid crystal layer 50, a polarizing plate 45 is provided.

The color filter 42, as illustrated in FIG. 4, has color portions of R (red), G (green), B (blue) (sometimes referred to as 46R, 46G, 46B) and the like formed in a predetermined arrangement with black layers 47 therebetween.

Next, a method of manufacturing the above-described liquid crystal display device 10 will be explained. A manufacturing process including a compensation process will be mainly explained here.

Figure 5:
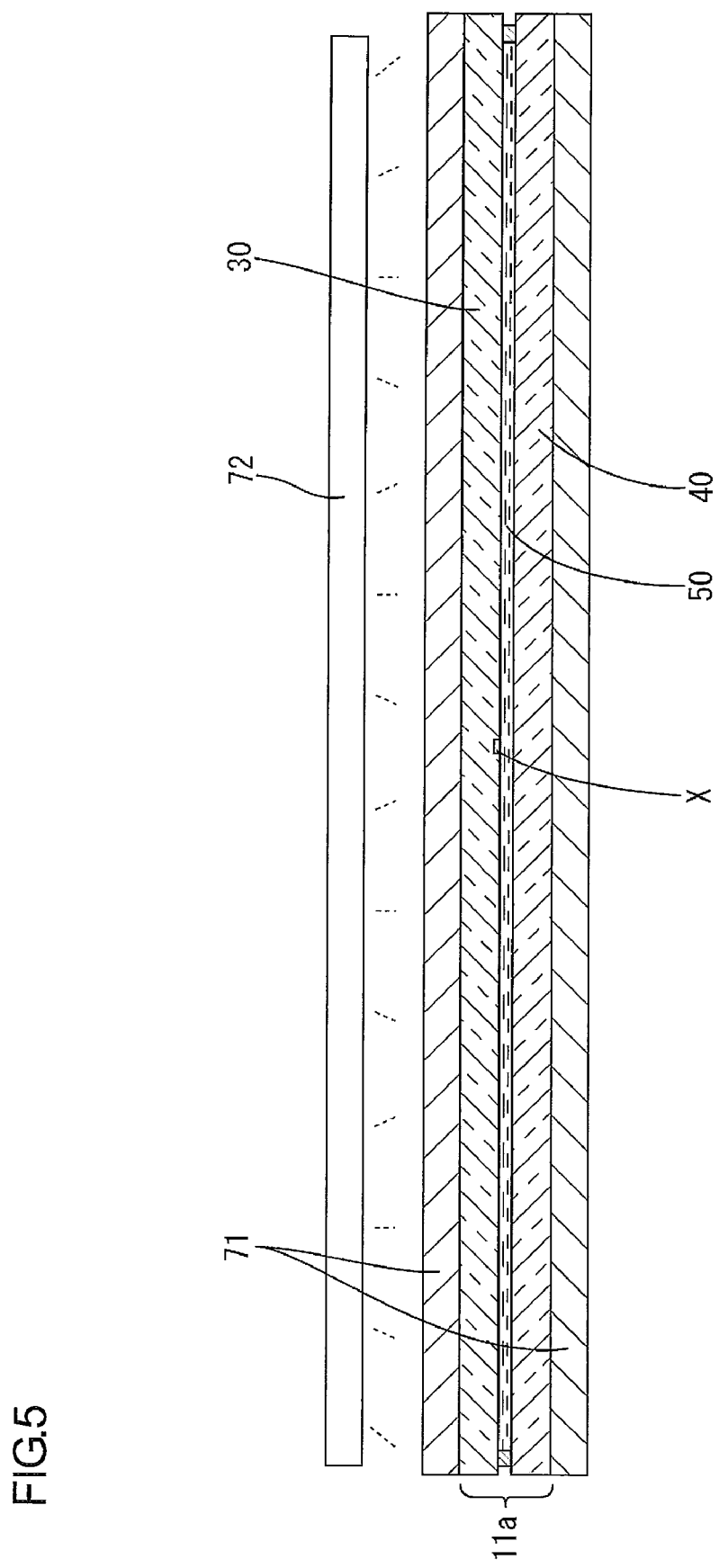
FIG. 5 is an explanatory view explaining an illumination inspection process for a liquid crystal panel, which is an inspection object.
Figure 6:
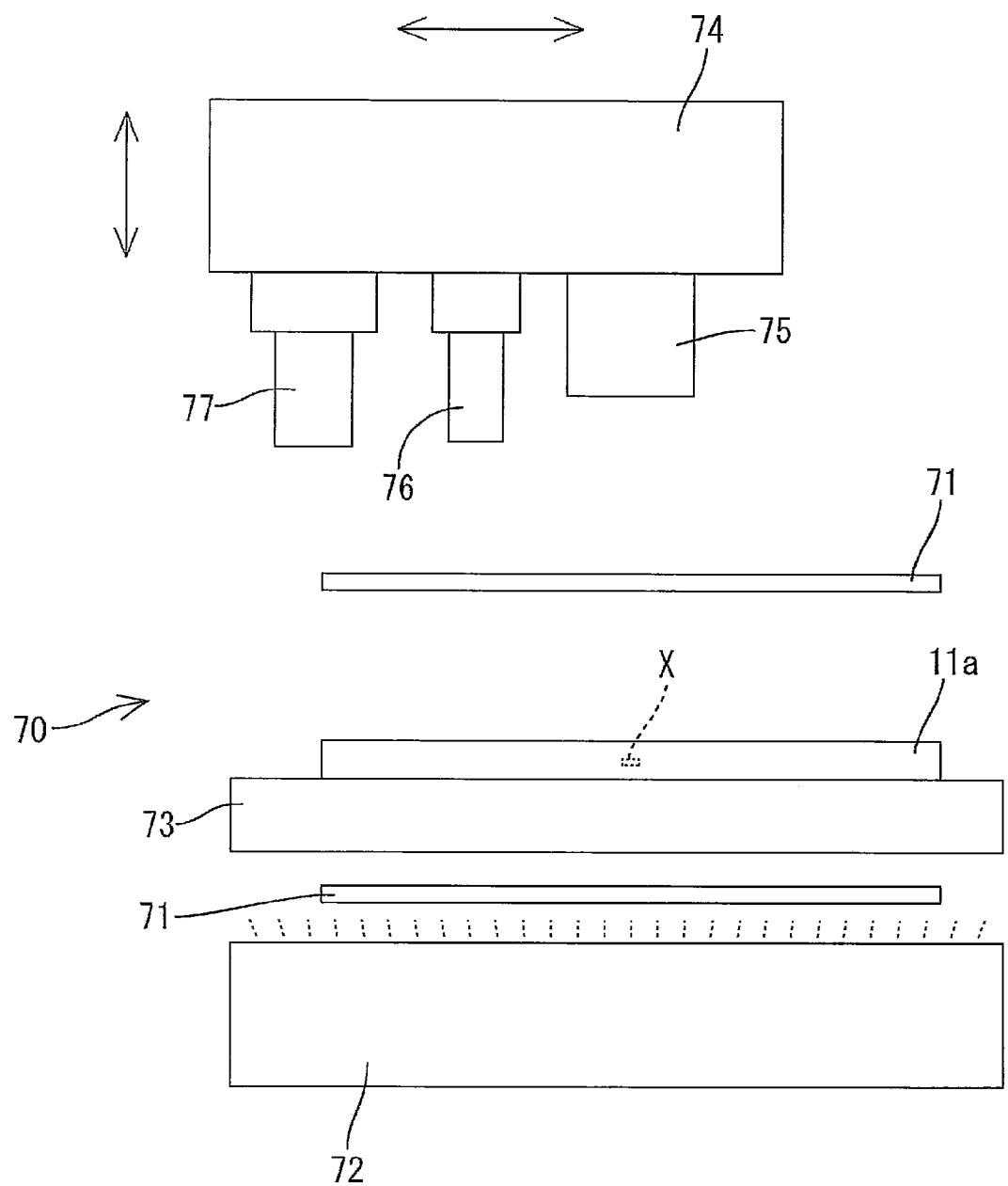
FIG. 6 is a side view illustrating a general construction of a color defect compensation device.
Figure 7:
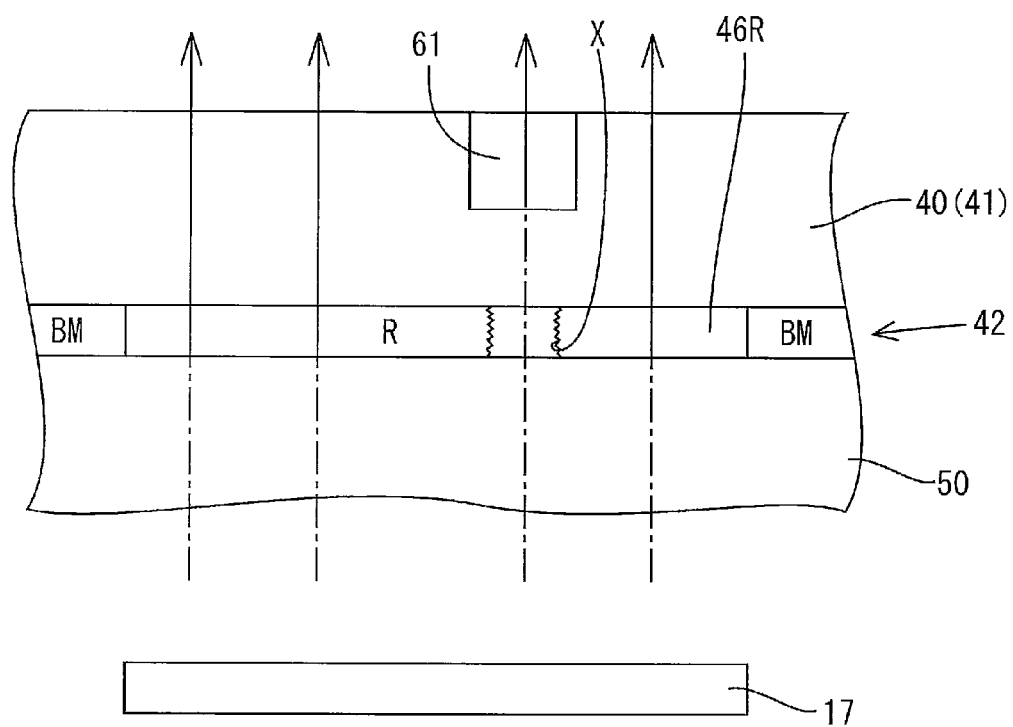
FIG. 7 is an explanatory view explaining operational effect of the liquid crystal display device illustrated in FIG. 1.

FIG. 5 is an explanatory view explaining an illumination inspection process for a liquid crystal panel, which is an inspection object. FIG. 6 is a side view illustrating a general construction of a color defect compensation device. FIG. 7 is an explanatory view explaining operational effect of the liquid crystal display device according to the present embodiment.

First, the glass substrate 31 is prepared, and the TFTs 32 and the pixel electrodes 33 are formed on the glass substrate 31. Next, the alignment film 34 is formed on the TFTs 32 and the pixel electrodes 33 to produce the board 30, which is a component board.

Meanwhile, the glass substrate 41, which is another glass substrate other than the above-described glass substrate 31, is prepared. The color filter 42 in which color portions 46 of R (red), G (green), B (blue) and the like are formed with black layers 47 therebetween is formed on the glass substrate 41 (see FIG. 4), and the counter electrode 43 is formed on the color filter 42. Furthermore, the alignment film 44 is formed on the counter electrode 43 to produce the board 40, which is an opposite board.

The boards 30 and 40 are bonded together with a predetermined gap between them. Liquid crystal is sealed in the gap to form the liquid crystal layer 50. Moreover, the polarizing plates 35 and 45 are arranged on the opposite sides of the boards 30 and 40 from the liquid crystal layer 50, respectively, to produce the liquid crystal panel 11 (see FIG. 3). In an assembly process of the liquid crystal panel 11 and the backlight device 12, which will be explained later, the board 30 (or the glass substrate 31) among those boards 30 and 40 is arranged on the backlight device 12 side.

In the above-described manufacturing process, an illumination inspection for detecting display failures is performed after the liquid crystal layer 50 is formed. The liquid crystal panel in the manufacturing process is referred to as a test liquid crystal panel 11a hereinafter.

More specifically, a pair of polarizing plates 71 for inspection is arranged so as to sandwich the boards 30, 40 of the test liquid crystal panel 11a, as illustrated in FIG. 5. A backlight 72 for inspection is turned on. Electrical lines formed on the glass substrate 31 are connected to a test circuit and appropriate electrical signals are fed to respective lines to drive the TFTs 32. Display conditions created by controlling alignment of the liquid crystal that forms the liquid crystal layer 50 are inspected through image processing or visually by an inspector.

In the inspection, a color defect, that is, a dot always displayed in white (i.e., white spot) during color display may be detected. Such a color defect may result from that a part of the color portion 46 of the color filter 42 is broken (referred to as a color defect occurrence area X) due to a foreign substance or the like present in the liquid crystal layer 50. When such a color defect is detected, a color defect compensation process, which will be explained next, will be performed for compensating for the color defect.

The color defect compensation process includes specifying a compensation area in the glass substrate 41 that overlaps a shadow of the color defect occurrence area X projected on the glass substrate 41, doping metal ions 60 that correspond to a color of the color portion 46 that includes the color defect occurrence area X in the specified compensation area, and forming a colored portion 61 having the same color as the color portion 46 by applying laser having a femtosecond order or shorter pulse width to the doped metal ions 60.

In the color defect compensation process, a color defect compensation device 70 illustrated in FIG. 6 is used for compensating for a color defect. The color defect compensation device 70 has a stage 73 (not illustrated in FIG. 5), a pair of polarizing plates 71 for inspection, a backlight 72 for inspection and an XYZ driving section 74. The stage 73 is provided for setting on the test liquid crystal panel 11a, which is a compensation object. The polarizing plates 71 are arranged so as to sandwich the stage 73. The XYZ driving section 74 moves in horizontal and vertical directions of the stage 73. The XYZ driving section 74 has a CCD camera 75, an ion implantation section 76 and a laser emitting section 77 arranged in predetermined relative positions. The CCD camera 75 is provided for capturing the color defect occurrence area X and its surrounding area. The ion implantation section 76 implants metal ions 60. The laser emitting section 77 emits laser for forming the colored portion 61. The stage 73 is made of glass so as to transmit light emitted from the backlight 72.

With the color defect compensation device 70, a compensation area in the glass substrate 41 that overlaps the shadow of the color defect occurrence area X projected on the glass substrate 41 is specified. First, the test liquid crystal panel 11a, which may be a compensation object, is set on the stage 73 in the predetermined position. It should be set such that the glass substrate 41 is on the top. Next, the backlight 72 for inspection is turned on to put the test liquid crystal panel 11a in a black display state. In this condition, the XYZ driving section 74 is moved in the horizontal direction of the stage 73 to capture display conditions by the CCD camera 75. The captured display conditions are processed through image processing to provide information on location and size of the color defect occurrence area X. A compensation area in the glass substrate 41 that overlaps the shadow of the color defect occurrence area X is specified.

Next, doping the metal ions 60 that correspond a color of the color portion 46 that includes the color defect occurrence area into the specified compensation area in the glass substrate 41 will be performed.

In this operation, areas on the glass substrate 41 other than the specified compensation area are masked. In this embodiment, the glass substrate 41 is masked by a photolithographic method and then mask on the specified compensation area is etched. The surface of the glass substrate 41 (i.e., the top surface of the test liquid crystal panel 11a in FIG. 6) is exposed.

Next, the metal ions 60 are doped in the specified compensation area (i.e., the area that is not masked). In this embodiment, the color defect occurrence area X is present in the R (red) color portion 46R. Selenium ions and cadmium ions are doped as metal ions corresponding to the color portion 46R. The ion doping is performed by an ion implantation method. More specifically, the XYZ driving section 74 is moved so that the ion implantation section 76 is positioned directly above the specified compensation area and the metal ions 60 are doped. In this embodiment, implantation conditions including an accelerating voltage are varied during the ion implantation and the metal ions 60 are doped from the surface of the glass substrate 41 up to halfway in its thickness direction.

Next, forming the colored portion 61 having the same color as the color portion 46 that includes the color defect occurrence area X in the area in which the metal ions 60 are doped is performed. In this operation, the colored portion 61 is formed by applying femtosecond laser having a $10^{-13}$ second-order pulse width to the glass substrate 41. More specifically, the XYZ driving section 74 is moved so that the laser emitting section 77 is positioned directly above the area in which the metal ions 60 are doped and then lesser application is performed. In this embodiment, the laser is applied in the following condition: 780 nm wavelength, 100 fs pulse width, 1 kHz repeating frequency, 1 mJ pulse energy and 1 W output.

When laser is applied to the area in which selenium ions and cadmium ions are doped as the metal ions 60, states of those ions change and the same red color as the color portion 46R is present. By moving the laser beam focus continuously within the glass substrate 41, the portion in the red color is formed as a continuous area along a trace of laser beam focuses. In this embodiment, the colored portion 61 in the same red color as the color portion 46R that includes the color defect occurrence area X is formed from the surface of the glass substrate 41 up to halfway in its thickness direction.

A driver (not illustrated) that is manufactured in a different process and the backlight device 12 are assembled to the liquid crystal panel 11 in which the compensation for the color defect is performed in the above process to produce the liquid crystal display device 10.

According to the method of manufacturing the liquid crystal display device 10 of the present embodiment, the liquid crystal display device 10 in which the colored portion 61 having the same color as the color portion 46R that includes the color defect occurrence area X is formed in the area that overlaps the shadow of the color defect occurrence area of the color filter 42 in the glass substrate 41 is provided.

The effect of the compensation for the color defect of the liquid crystal display device 10 will be explained referring to FIG. 7. In FIG. 7, dashed line arrows and solid line arrows indicate beams of white light provided by the cold cathode tube 17 and that of red light in the same color as 46R, respectively.

As illustrated in FIG. 7, light provided by the cold cathode tube 17 changes its color from white to red when passing through the color portion 46R and travels to the display surface. On the other hand, the light provided by the cold cathode tube 17 does not changes its color from white to red when passing through the color defect occurrence area X of the color portion 46R. However, because the colored portion 61 is formed in red in the area that overlaps the shadow of the color defect occurrence area X on the glass substrate 41 (that is directly above the color defect occurrence area X in FIG. 7), the light changes its color to the same color as the color portion 46R when passing through the colored portion 61. As a result, on the display surface of the liquid crystal display device 10, the light that has passed through the color defect occurrence area X is viewed in the same color as the light that has passed through a normal area of the color filter 42. Thus, a high display quality is provided.

Furthermore, in this embodiment, the metal ions 60 are doped in the compensation area of the glass substrate 41 and the colored portion 61 is formed by applying the laser having a femtosecond pulse width to the metal ions 60.

Such coloring means using doping of the metal ions 60 is less likely to degrade the strength of the glass substrate 41. Thus, it is preferable as compensation means in a mass production line.

Moreover, when the femtosecond laser is applied to the glass substrate, energy is absorbed by the laser application area faster than conduction of heat created by the laser to a surrounding area of the laser application area. The glass substrate around the laser focus is not thermally or chemically damaged. Thus, the display quality of the liquid crystal display device 10 is less likely to be degraded.

In doping of the metal ions 60 of this embodiment, areas of the glass substrate 41 other than the compensation area are masked.

By masking the areas other than the compensation area, the metal ions 60 are accurately doped only in the compensation area. This restricts mixture of colors with portions in other colors.

In this embodiment, the color defect occurrence area X is present in the R (red) color portion 46R, and therefore selenium ions and cadmium ions are doped as the metal ions 60.

By selecting appropriate metals (selenium ions and cadmium ions in this embodiment) according to the color portion 46R in which the color defect occurrence area X is included, the colored portion 61 having the same color as the color portion 46R is formed.

The present invention is not limited to embodiment 1 explained in the above description made with reference to the drawings. The following embodiments may be included in the technical scope of the present invention, for example.

The above embodiment 1 explains a case that the R (red) color portion 46R is damaged. However, the present invention can be applied in a case that the B (blue) color portion 46B is damaged. In this case, a colored portion in blue can be provided by doping cobalt ions in the glass substrate as the metal ions 60.

The above embodiment 1 explained a case that the R (red) color portion 46R is damaged. However, the present invention can be applied in a case that the G (Green) color portion 46G is damaged. In this case, a colored portion in green can be provided by doping chrome ions in the glass substrate as the metal ions 60.

In the above embodiment 1, the colored portion 61 is formed in the glass substrate 41 arranged on an opposite side from the backlight device 12 side (i.e., on the display surface side). However, it can be formed in the glass substrate 31 arranged on the backlight device 12 side.

In the above embodiment 1, the colored portion 61 is formed up to halfway in the thickness direction of the glass substrate 41. However the depth of the colored portion is not limited to that size, and it may be formed from the top to the bottom in the thickness direction of the glass substrate 41, for example.

In the above embodiment 1, specifying the compensation area, doping the metal ions 60, and forming the colored portion 61 by application of laser are performed by the color defect compensation device 70. However, separate devices may be used for performing those operations to make a structure of each device simple.

In the color defect compensation device 70 of the above embodiment 1, the XYZ driving section 74, which includes the DDC camera 75, the ion implantation section 76 and the laser emitting section 77, moves in the horizontal or vertical direction of the stage 73. However, the color defect compensation device 70 can have configurations such that a stage moves in the horizontal or vertical direction of a CCD camera, an ion implantation section and a laser emitting section that are fixed.

Embodiment 2

Next, embodiment 2 of the present invention will be explained with reference to FIGS. 8 to 10. Difference between embodiment 1 and the present embodiment is that a liquid crystal panel manufacturing process of the present embodiment includes a process for producing a glass substrate that produce the same color effect as the color filter, that is, a glass substrate having a coloring portion (also referred to as a color glass hereinafter). Other processes are the same as the previous embodiment. Parts same as the previous embodiment are indicated with the same symbols and will not be explained. The liquid crystal panel 11 in embodiment 1 is referred to as a liquid crystal panel 111 in this embodiment.

Figure 8:
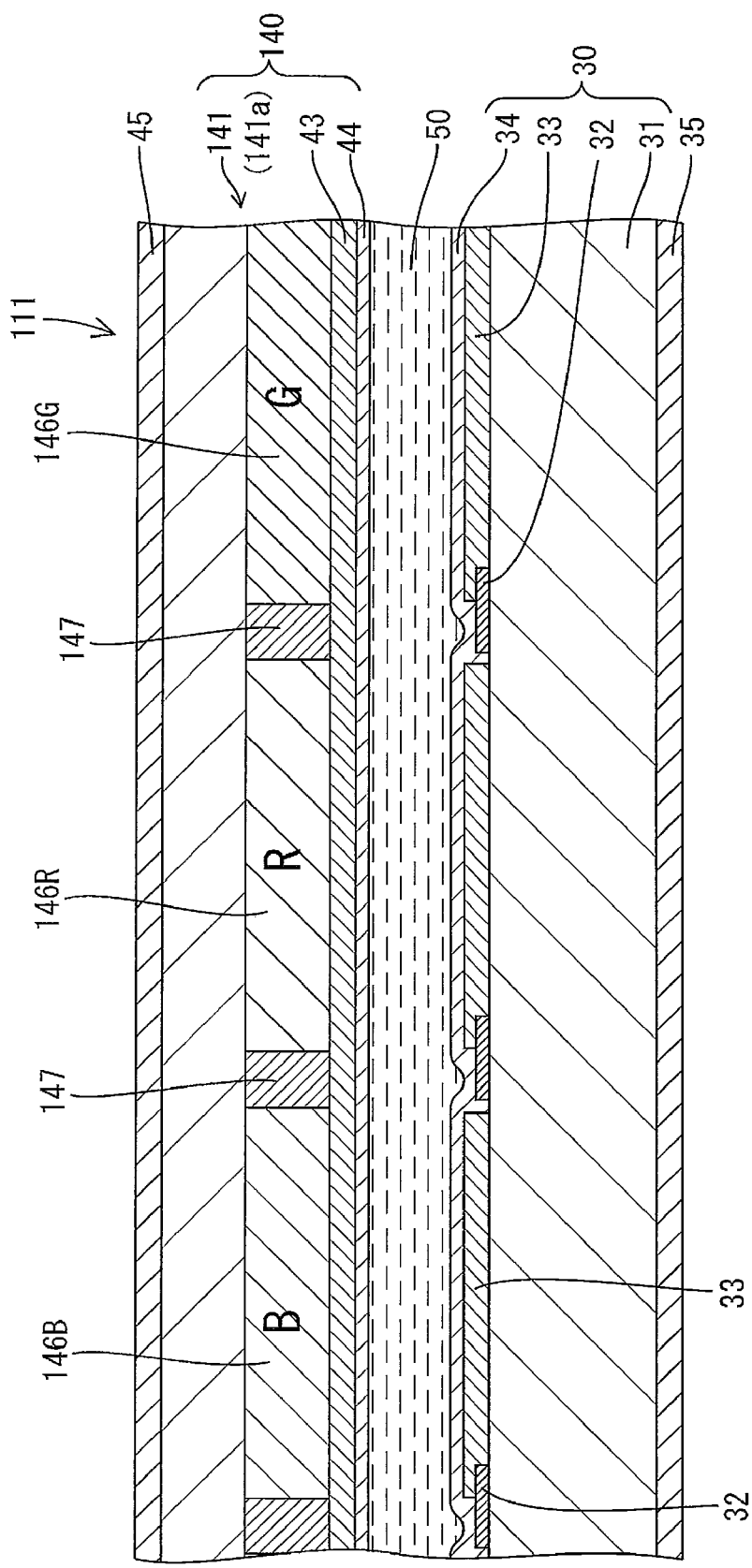
FIG. 8 is a cross-sectional view of a main part of a liquid crystal panel included in a liquid crystal display device according to embodiment 2 of the present invention.

FIG. 8 is a cross-sectional view of a main part of a liquid crystal panel included in a liquid crystal display device according to this embodiment. FIG. 9 is a plan view of a main part of a color glass included in the liquid crystal panel illustrated in FIG. 8. FIG. 10 is a side view illustrating a general construction of a color glass forming device.

The liquid crystal panel 111, as illustrated in FIG. 8, includes a pair of boards 30, 140 bonded together with a predetermined gap between them and liquid crystal sealed between the boards 30, 140. The liquid crystal forms the liquid crystal layer 50.

The board 140 is an opposite board including a glass substrate 141, an counter electrode 43, and alignment film 44. The counter electrode 43 is formed on the liquid crystal 50 side of the color filter 42. The alignment film 44 is formed on the liquid crystal 50 side of the counter electrode 43. On an opposite side of the glass substrate 41 from the liquid crystal layer 50, a polarizing plate 45 is provided.

Figure 9:
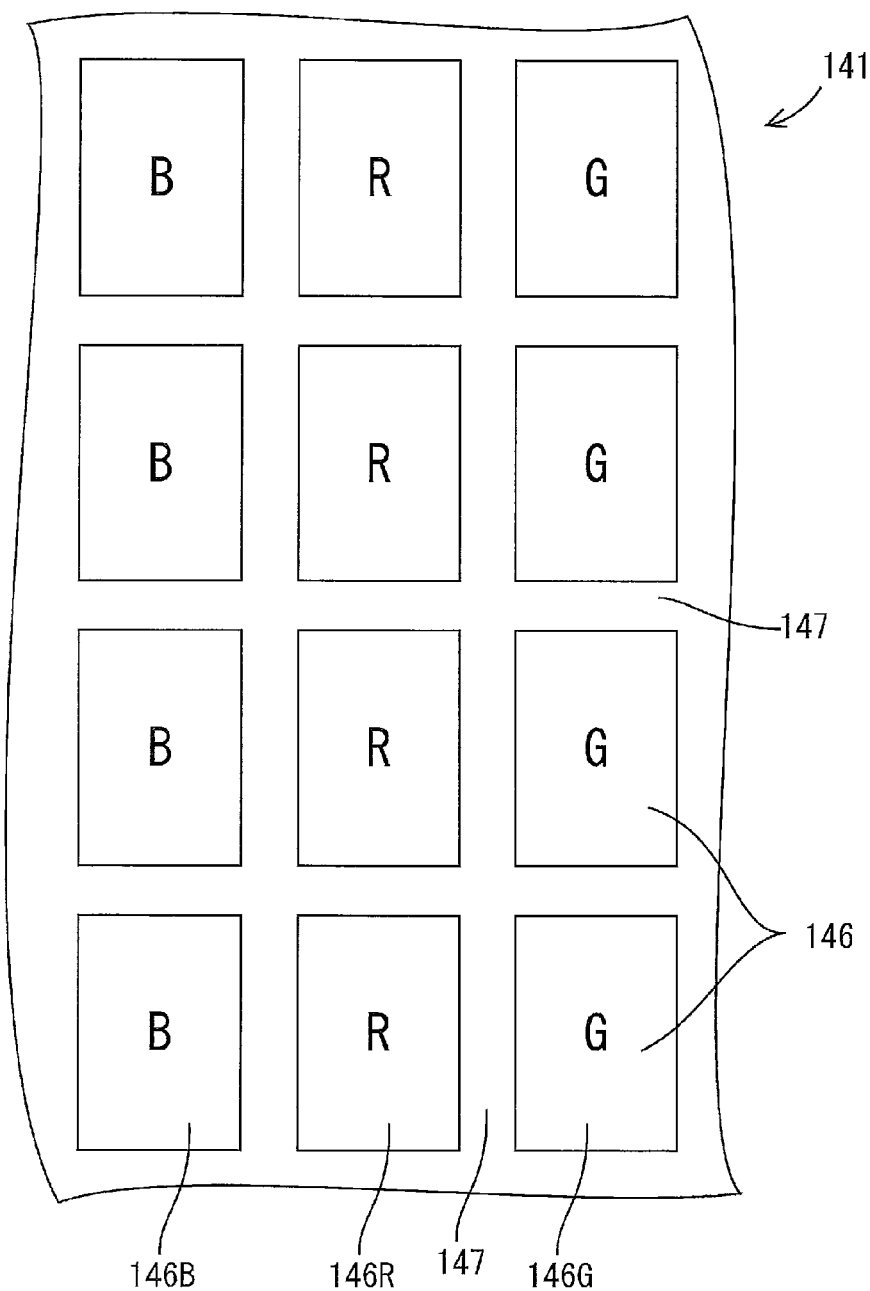
FIG. 9 is a plan view of a main part of a color glass included in the liquid crystal panel illustrated in FIG. 8.

The glass substrate 141, as illustrated in FIG. 9, has coloring portions 146 of R (red), G (green), B (blue) (sometimes referred to as 146R, 146G, 146B) and the like arranged in a predetermined manner with black layers 147 therebetween. The black layers 147 are formed to restrict mixture of colors among the coloring portions 146.

Next, a method of manufacturing the above-described liquid crystal display device 10 will be explained. A process for producing the glass substrate 141 will be mainly explained here.

The process for producing the glass substrate includes doping a plurality of kinds of metal ions in a glass base substrate 141a in a predetermined arrangement, and coloring areas of the glass base substrate in which the metal ions 160 are doped by applying laser having a femtosecond-order or shorter pulse width to the areas to form coloring portions 146 in a plurality of colors in a predetermined arrangement.

Figure 10:
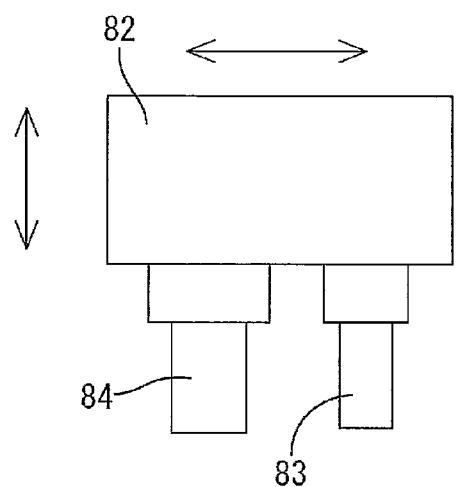
FIG. 10 is a side view illustrating a general construction of a color glass forming device.
Figure 10:
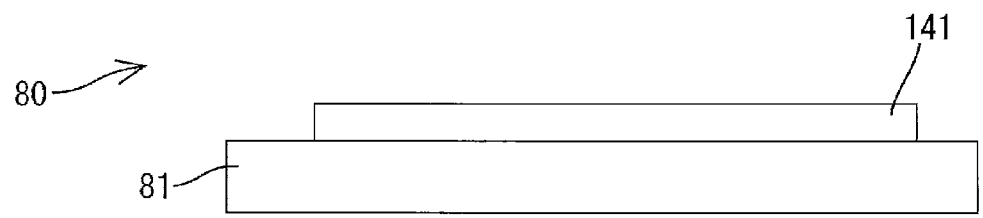

In those operations, the glass substrate 141 is formed using a color glass forming device 80 illustrated in FIG. 10. The color glass forming device 80 has a stage 81 for setting on the glass base substrate 141a and an XYZ driving section 82 that moves in horizontal and vertical directions of the stage 81. The XYZ driving section 82 has an ion implantation section 83 for implanting the metal ions 160 and a laser emitting section 84 for emitting laser for forming the coloring portions 146. They are arranged in predetermined relative positions.

In the arrangement doping, the glass base substrate 141a is prepared and areas of the glass base substrate 141a other than areas in which the blue coloring portions 146B will be formed are masked. In this embodiment, the surface of the glass base substrate 141a is masked by a photolithographic method and mask covering the areas in which the blue coloring portions will be formed are etched. As a result, exposed areas are formed on the glass base substrate 141a.

Next, cobalt ions as the metal ions 160 are doped in the areas in which the blue coloring portion 146B will be formed (i.e., the areas that are not masked). The doping of the ions is performed by an ion implantation method. Specifically, the XYZ driving section 82 is moved so that the ion implantation section 83 is positioned directly above the specified compensation area and the metal ions 160 are doped. In this embodiment, implantation conditions including an accelerating voltage are varied during the ion implantation and the metal ions 160 are doped from the surface of the glass base substrate 141a up to halfway in its thickness direction. Then, the mask is removed and the doping of the metal ions 160 in the predetermined arrangement for forming the blue coloring portions 146B is completed.

The above doping in the predetermined arrangement is performed for the green coloring portions 146G, the red coloring portions 146R and the black portions 147 that are formed between the coloring portions 146. In this embodiment, chrome ions are doped in the areas in which the green coloring portions 146G will be formed as the metal ions 160. Selenium ions and cadmium ions are doped in the areas in which the red coloring portions 146R will be formed. Cobalt ions, chrome ions, selenium ions and cadmium ions are doped in the areas in which the black portions 147 will be formed.

After the metal ions 160 are doped in the respective portions in which three kinds of coloring portions 146 and the black portions 147 will be formed, forming coloring portions is performed.

In the coloring (or forming of a color glass) the coloring portions 146 and the black portions 147 are formed by applying femtosecond laser having a $10^{-13}$ second-order pulse width to the glass base substrate 141a. Specifically, the XYZ driving section 82 is moved so that the laser emitting section 84 is positioned directly above the area in which the metal ions 160 are doped, and the laser is applied. In this embodiment, the laser is applied in the following condition: 780 nm wavelength, 100 fs pulse width, 1 kHz repeating frequency, 1 mJ pulse energy and 1 W output.

When laser is applied to the area in which cobalt ions are doped as the metal ions 160, a state of those ions changes and a blue color is present. In the same manner, when the laser is applied to the areas in which the chrome ions are doped and the areas in which the selenium and cadmium ions are doped, green color and red color are present, respectively. When the laser is applied to the area in which the cobalt ions, chrome ions, selenium ions and cadmium ions are doped, black color is present.

By moving the laser beam focus continuously within the glass base substrate 141a, the portions in the respective colors are formed as continuous areas along traces of laser beam focuses. By doing so, the glass substrate 141 in which the blue coloring portions 146B, the green coloring portions 146G, the red coloring portions 146R and the black portions 147 are formed in a predetermined arrangement (see FIG. 9) is formed. In this embodiment, the coloring portions 146 and the black portions 147 are formed from the surface of the glass base substrate 141a up to halfway in its thickness direction.

The counter electrode 43 is formed on the glass substrate 141 produced in the above process on a side that the coloring portions 146 are formed. Moreover, the alignment film 44 is formed on the counter electrode 43. The board 140, which is an opposite board, is produced.

The board 140 and the board 30, which is produced in the different process, are bonded together with a predetermined gap and liquid crystal is sealed therebetween to form the liquid crystal layer 50. Polarizing plates 35, 45 are disposed on opposite surfaces of the boards 30, 140 from the liquid crystal layer 50 side, respectively. The liquid crystal panel 111 is produced (see FIG. 8).

The liquid crystal panel 111, a driver (not illustrated) produced in a different process and the backlight device 12 are assembled to produce the liquid crystal display device 10. In an assembly of backlight device 12, the board 30 (or the substrate 31) among the boards 30, 140 is disposed on the backlight device 12 side.

According to the method of manufacturing the liquid crystal display device 10 of the present embodiment including the forming of the glass substrate, the liquid crystal display device 10 having the glass substrate (or the color glass) 141 in which a plurality of coloring portions 146 are formed in the predetermined arrangement is provided. With the liquid crystal display device 10, light provided by the backlight device 12 is colored in a predetermined color when passing through each coloring portion 146 of the glass substrate 141. Therefore, the same coloring effect is provided as the color filter.

Furthermore, the glass substrate 141 itself is colored and becomes a color glass. Its mechanical strength is higher than that of a resin color filter. Thus, it is less likely to be damaged by a foreign substance in the manufacturing process.

In the present embodiment, the coloring portions 146 are formed in the predetermined arrangement by doping the metal ions 160 in the glass base substrate 141a in the predetermined arrangement and applying the femtosecond laser to the metal ions 160.

Such coloring means with doping of the metal ions 160 is less likely to degrade the strength of the glass base substrate 141a. Therefore, it is preferable compensation means in a mass production line.

When the femtosecond laser is applied to the glass base substrate 141a, energy is absorbed by the laser application area faster than conduction of heat created by the laser to a surrounding area of the laser application area. The glass base substrate 141a around the laser focus is not thermally or chemically damaged. Thus, the display quality of the liquid crystal display device 10 is less likely to degrade.

In the arrangement doping of the present embodiment, the areas of the glass base substrate 141a in which the predetermined metal ions 160 are not doped are masked to cover the glass base substrate 141a.

In this case, the surfaces of the glass base substrate 141a in the areas in which the predetermined metal ions 160 are doped are exposed, and the surfaces in the other areas (i.e., areas in which different metal ions will be doped) are masked. The areas in which the predetermined metal ions 160 are not doped are patterned by masking, the metal ions 160 are doped only in the predetermined areas. Thus, the metal ions 160 are not mixed with the ones in the adjacent areas and mixture of colors in the coloring portions 146 does not occur.

In the present embodiment, laser application is performed after the metal ions 160 corresponding to the respective coloring portions 146 in a plurality of colors, R (red), G (green) and B (blue), are all doped.

By doping the respective metal ions 160 in sequence and then applying the laser to the glass base substrate 141a collectively, working efficiency improves.

The present embodiment includes the forming of the blue coloring portions 146B, the green coloring portion 146G and the red coloring portions 146R as the coloring portions 146 by doping the respective metal ions 160. Specifically, the cobalt ions are doped in the areas in which the blue coloring portions 146B will be formed. The chrome ions are doped in the areas in which the green coloring portions 146G will be formed. The selenium ions and cadmium ions are doped in the areas in which the red coloring portions 146R will be formed.

By selecting appropriate metal ions for the coloring portions 146, the coloring portions 146 in the predetermined colors can be formed.

The present invention is not limited to embodiment 2 explained in the above description made with reference to the drawings. The following embodiments may be included in the technical scope of the present invention, for example.

In the above embodiment 2, the coloring portions 146 are formed in the glass substrate 141 disposed on the display surface side. However, it can be formed in the glass substrate 31 disposed on the backlight device 12 side.

In the above embodiment 2, the black portions 147, which are located between the coloring portions 146, are formed by doping cobalt, chrome, selenium and cadmium ions in the glass base substrate 141a. However, the black portions can be formed in any other way as long as adjacent colors on the display surface do not mix. For example, the black layer can be formed on the surface of the glass substrate on the liquid crystal layer side.

In the above embodiment 2, the coloring portions 146 are formed up to halfway in the thickness direction of the glass base substrate 141a. However, the depth of the coloring portions is not limited to that size. For example, the coloring portions may be formed from top to bottom in the thickness direction of the glass base substrate 141a.

In the above embodiment 2, the doping of the metal ions 160, and the forming of the coloring portions 146 by application of laser are performed by the color glass forming device 80. However, separate devices may be used for performing those operations to make a structure of each device simple.

In the color glass forming device 80 of the above embodiment 2, the XYZ driving section 82, which includes the ion implantation section 83 and the laser emitting section 84, moves in the horizontal or vertical direction of the stage 81. However, the color glass forming device 80 can have configurations such that a stage moves in the horizontal or vertical direction of an ion implantation section and a laser emitting section that are fixed.

Other Embodiment

The present invention is not limited to embodiments 1, 2 explained in the above description made with reference to the drawings. The following embodiments may be included in the technical scope of the present invention, for example.

In the above embodiments 1, 2, the femtosecond laser having a 100 fs pulse width is applied for forming the colored portions 61 and the coloring portions 146. In a view of reducing damages to surrounding areas of the laser focus, the pulse width is smaller the better. Thus, laser having a smaller pulse width within an acceptable range for compensation efficiency can be used.

In the above embodiments 1, 2, the wavelength of laser used to form the colored portions 61 and the coloring portions 146 is 780 nm. However, laser having any wavelength such as an ultraviolet wavelength (e.g., 260 nm) can be used. Moreover, other conditions of laser application may be changed based on composition of the glass substrate to which the laser is applied.

The present invention can be also applied to a liquid crystal display device using switching elements other than TFTs 32.

The invention claimed is:

1. A method of manufacturing a liquid crystal display device including a liquid crystal panel having a liquid crystal layer between a pair of glass substrates and a lighting device that provides illumination light to said liquid crystal panel, wherein at least one of said pair of glass substrates having a color filter in which a plurality of color portions are formed in a predetermined arrangement, comprising a color defect compensation process for compensating for a color defect if such a color defect is present, said color defect compensation process includes:

specifying a compensation area in at least one of said pair of glass substrates, the compensation area that overlaps a shadow of color defect occurrence area that is a possible cause of said color defect, the shadow being projected on the one of said pair of glass substrates;

doping metal ions corresponding to a color of said color portion that includes said color defect occurrence area in said compensation area of said glass substrate, said compensation area being specified; and forming a colored portion having a same color as said color portion that includes said color defect occurrence area in said compensation area by applying laser having a femtosecond-order or shorter pulse width to said metal ions that are doped.

2. A method of manufacturing a liquid crystal display device as in claim 1, wherein the doping includes masking said glass substrate in an area other than said compensation area of said glass substrate.

3. A method of manufacturing a liquid crystal display device as in claim 1, wherein said color portions include a blue color portion and cobalt ions are doped as said metal ions in a case that said color defect occurrence area is included in the blue color portion.

4. A method of manufacturing a liquid crystal display device as in claim 1, wherein said color portions include a green color portion and chrome ions are doped as said metal ions in a case that said color defect occurrence area is included in the green color portion.

5. A method of manufacturing a liquid crystal display device as in claim 1, wherein said color portions include a red color portion and selenium ions and cadmium ions are doped as said metal ions in a case that said color defect occurrence area is included in the red color portion.

6. A method of manufacturing a liquid crystal display device including a liquid crystal panel having a liquid crystal layer between a pair of glass substrates and a lighting device that provides illumination light to said liquid crystal panel, comprising a glass substrate forming process for forming a glass substrate and producing a liquid crystal panel using said glass substrate, said glass substrate forming process includes:
doping a plurality of kinds of metal ions in a predetermined arrangement in a glass base substrate; and
coloring areas of said glass base substrate in which said metal ions are doped by applying laser having a femtosecond-order or shorter pulse width to the areas to form coloring portions in a plurality of colors and a predetermined arrangement in the glass base substrate.

7. A method of manufacturing a liquid crystal display device as in claim 6, wherein said doping in a predetermined arrangement includes masking said glass base substrate in an area other than an area in which predetermined metal ions are doped.

8. A method of manufacturing a liquid crystal display device as in claim 6, wherein application of said laser is performed in said coloring after metal ions corresponding to said coloring portions in a plurality of colors are all doped.

9. A method of manufacturing a liquid crystal display device as in claim 6, wherein said coloring includes forming a blue coloring portion as said coloring portion by doping cobalt ions as said metal ions in an area of said glass base substrate in which the blue coloring portion is to be formed.

10. A method of manufacturing a liquid crystal display device as in claim 6, wherein said coloring includes forming a green coloring portion as said coloring portion by doping chrome ions as said metal ions in an area of said glass base substrate in which the green coloring portion is to be formed.

11. A method of manufacturing a liquid crystal display device as in claim 6, wherein said coloring includes forming a red coloring portion as said coloring portion by doping selenium ions and cadmium ions as said metal ions in an area of said glass base substrate in which the red coloring portion is to be formed.

* * * * *